US008547435B2

(12) United States Patent
Mimar

(10) Patent No.: US 8,547,435 B2
(45) Date of Patent: *Oct. 1, 2013

(54) MOBILE SECURITY AUDIO-VIDEO RECORDER WITH LOCAL STORAGE AND CONTINUOUS RECORDING LOOP

(75) Inventor: Tibet Mimar, Morgan Hill, CA (US)

(73) Assignee: Selka Elektronik ve Internet Urunleri San.ve Tic.A.S (TR)

( * ) Notice: Subject to any disclaimer, the term of this patent is extended or adjusted under 35 U.S.C. 154(b) by 420 days.

This patent is subject to a terminal disclaimer.

(21) Appl. No.: 12/586,374

(22) Filed: Sep. 20, 2009

(65) Prior Publication Data

US 2012/0307050 A1 Dec. 6, 2012

(51) Int. Cl.
*H04N 9/47* (2006.01)

(52) U.S. Cl.
USPC ........ 348/143; 348/148; 348/151; 348/208.1; 348/208.3; 348/211.8

(58) Field of Classification Search
USPC ................ 348/143, 46, 148, 151, 153, 208.1, 348/208.3, 211.8
See application file for complete search history.

(56) References Cited

U.S. PATENT DOCUMENTS

| | | | | |
|---|---|---|---|---|
| 6,333,759 | B1 | 12/2001 | Mazzilli | |
| 7,228,439 | B2 | 6/2007 | Monroe | |
| 7,319,485 | B2 | 1/2008 | Szolyga et al. | |
| 7,548,586 | B1 * | 6/2009 | Mimar | 375/240.26 |
| 2003/0156192 | A1 | 8/2003 | Cho | |
| 2006/0209187 | A1 | 9/2006 | Farneman | |
| 2008/0020354 | A1 * | 1/2008 | Goree et al. | 434/11 |
| 2009/0207301 | A1 * | 8/2009 | Fransson | 348/371 |
| 2009/0278945 | A1 * | 11/2009 | Lin | 348/208.1 |
| 2010/0139290 | A1 * | 6/2010 | Leblond | 62/3.3 |
| 2010/0307223 | A1 * | 12/2010 | Jeftic-Stojanovski et al. | 73/12.04 |

* cited by examiner

*Primary Examiner* — Yves Dalencourt

(57) ABSTRACT

An internet connected mobile security system for recording at least one audio and video on a removable semiconductor storage media in a continuous record loop for evidentiary documentation purposes inside an automotive vehicle or as a wearable video recording device is described.

7 Claims, 15 Drawing Sheets

Prior Art Figure 1.

DEPTH = ½ Inch

*SIDE VIEW*

MOBILE SECURITY AUDIO-VIDEO RECORDER WITH LOCAL STORAGE AND CONTINUOUS RECORDING LOOP

BACKGROUND OF THE INVENTION

1. Field of the Invention

The invention relates generally to the field of surveillance and specifically to the field of mobile video security. More particularly, the present invention relates to mobile audio-video security with local semiconductor non-volatile storage and continuous recording loop.

2. Description of the Background Art

The evidentiary recording of video is used in some commercial vehicles and police cruisers. Block diagram of such a prior art system is shown in FIG. 1. These systems cost several thousand dollars and also is very bulky to be installed in regular cars. Also, there are certain video recording systems for teenager driving supervision cases that is triggered by certain threshold of acceleration and deceleration and records several second before and after each such trigger. In today's accidents, it is not clear who is at fault, because each party blames each other as the cause of accident, and police, unless accident happened to be actually observed by the police simply fills accident reports, where each party becomes responsible for their own damages. Driving at the legal limit causes tail gating, and other road rage, and later blaming the law-abiding drivers. Also, there is exposure to personal injury claims in the case of pedestrians jay walking, bicycles going in the wrong direction, red light runners, etc. Witnesses are very hard to find in such cases.

A vehicle video security system would provide evidentiary data and put the responsibility on the wrongful party and help with the insurance claims. However, it is not possible to spend several thousand dollars for such security for regular daily use in cars by most people.

A compact and mobile security could also be worn by security and police officers for recording events just as in a police cruiser. A miniature security device can continuously record daily work of officers and be offloaded at the end of each day and be archived. Such a mobile security module, must be as small as an iPod and be able to be clipped on the chest pocket where the camera module would be externally visible. Such a device could also be considered a very compact, portable and wearable personal video recorder that could be used to record sports and other activities just as a video camcorder but without having to carry-and-shoot by holding it, but instead attaching to clothing such as clipping.

Mobile Witness from Say Security USA consists of a central recording unit that weighs several pounds, requires external cameras, and records on hard disk. It uses MPEG-4 video compression standard, and not the advanced H.264 video compression. Some other systems use H.264 but record on hard disk drive and have external cameras, and is quite bulky and at cost points for only commercial vehicles.

Farneman (US Patent Application 20060209187) teaches a mobile video surveillance system with a wireless link and waterproof housing. The camera sends still images or movies to a computer network for viewing with a standard web browser. The camera unit may be attached to a power supply and a solar panel may be incorporated into at least one exterior surface. This application has no local storage, does not include video compression, and continuously streams video data.

Cho (US Patent Application 20030156192) teaches a mobile video security system for use at the airports, shopping malls and office buildings. This mobile video security system is wireless networked to central security monitoring system. All of security personnel carry a wireless hand held personal computer to communicate with central video security. Through the wireless network, all of security personnel are capable to receive video images and also communicate with each other. This application has no local storage, does not include video compression, and continuously streams video data.

Szolyga (U.S. Pat. No. 7,319,485, Jan. 15, 2008) teaches an apparatus and method for recording data in a circular fashion. The apparatus includes an input sensor for receiving data, a central processing unit coupled to the buffer and the input sensor. The circular buffer is divided into different sections that are sampled at different rates. Once data begins to be received by the circular buffer, data is stored in the first storing portion first. Once the first storage portion reaches a predetermined threshold (e.g. full storage capacity), data is moved from the first storage portion to the second portion. Because the data contents of the first storage portion are no longer at the predetermined threshold, incoming data can continue to be stored in the first storage portion. In the same fashion, once the second storage portion reaches a predetermined threshold, data is moved from the second storage portion to the third storage portion. Szolyga does not teach video compression, having multiple cameras multiplexed, removable storage media, video preprocessing for real-time lens correction and video performance improvement and also motion stabilization.

Mazzilli (U.S. Pat. No. 6,333,759, December 2055, 2001) teaches 360 degree automobile video camera system. The system consists of camera module with multiple cameras, a multiplexer unit mounted in the truck, and a Video Cassette Recorder (VCR) mounted in trunk. Such a system requires extensive wiring, records video without compression, and due to multiplexing of multiple video channels on a standard video, it reduces the available video quality of each channel.

Existing systems capture video data at low resolution (CIF or similar at 352×240) and at low frame rates (<30 fps), which results in poor video quality for evidentiary purposes. Also, existing systems do not have multiple cameras, video compression, and video storage not incorporated into a single compact module, where advanced H.264 video compression and motion stabilization is utilized for high video quality. Furthermore, existing systems are at high cost points in the range of $750-$4,000, which makes it not practically possible to be used in consumer systems and wide deployment of large number of units.

SUMMARY OF THE INVENTION

The present invention provides a compact personal video recorder for applications in mobile audio-video security for evidentiary documentation purposes, where a removable semiconductor non-volatile storage media is used to record audio-video in a continuous record loop. In an embodiment for car video recording, two or more camera sensors are used, where video preprocessing includes Image Signal Processing (ISP) for auto exposure, auto white balance, camera sensor Bayer conversion, real-time lens barrel distortion reduction, motion adaptive spatial and temporal filtering, and video motion stabilization, etc. H.264 video compression is used for improved video quality and reduced storage requirements, and provides for high-resolution capture of multiple channels of standard definition video at 30 fps. An embodiment includes an accelerometer to also record acceleration data, and derived speed data along with audio and multiple channels of video. One embodiment uses a built-in LCD and solar cell based charging of built-in rechargeable battery.

BRIEF DESCRIPTION OF DRAWINGS

The accompanying drawings, which are incorporated and form a part of this specification, illustrate prior art and embodiments of the invention, and together with the description, serve to explain the principles of the invention.

Prior art

DETAILED DESCRIPTION

Figure 1:
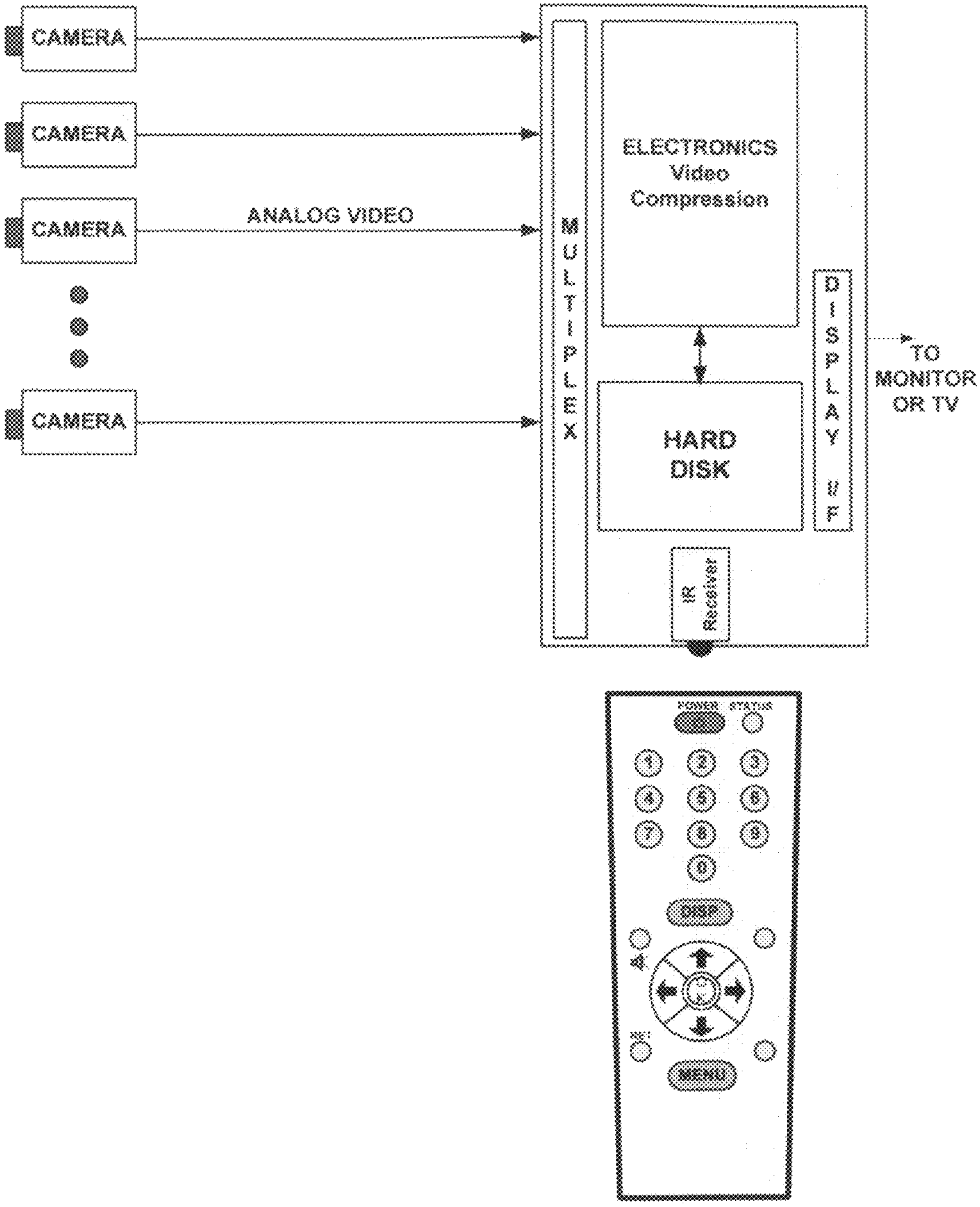
FIG. 1 shows a typical mobile security system with multiple cameras.
Figure 2:
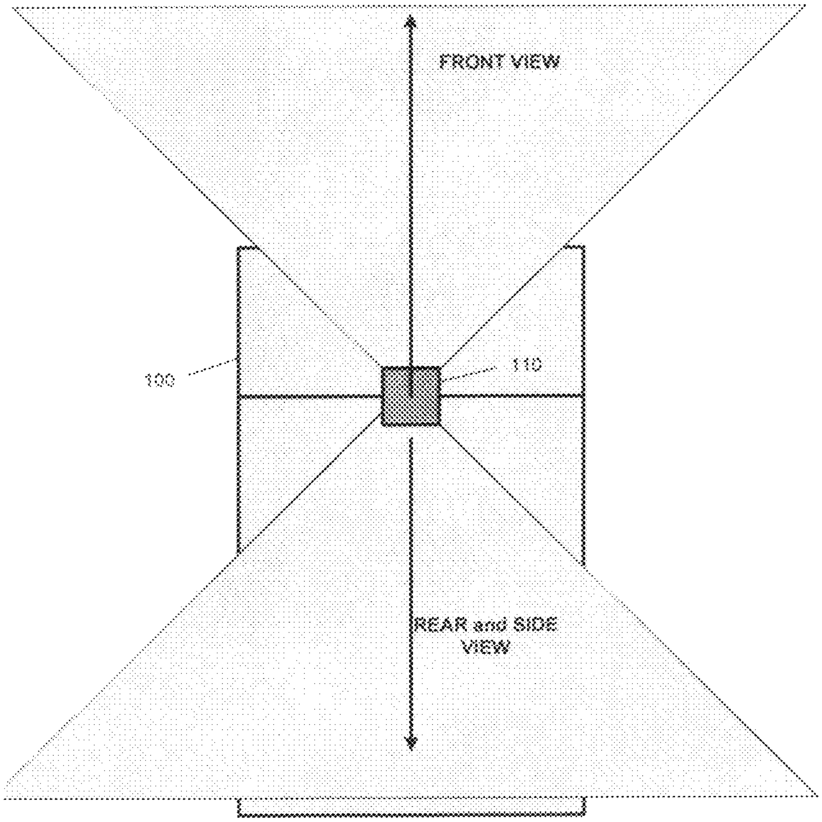
FIG. 2 shows the top view of a dual-camera car security system.

The present invention provides a compact personal video recorder with one or more cameras embedded in the same package for documentary audio-video recording on a removable storage media as part of the same compact packaging. FIG. 2 shows two-camera embodiment of present invention mounted near the front mirror of a car 100. The compact camera module 110 can be mounted on the windshield or partially behind the windshield mirror, with one camera facing forward and one camera facing backward.

Figure 3:
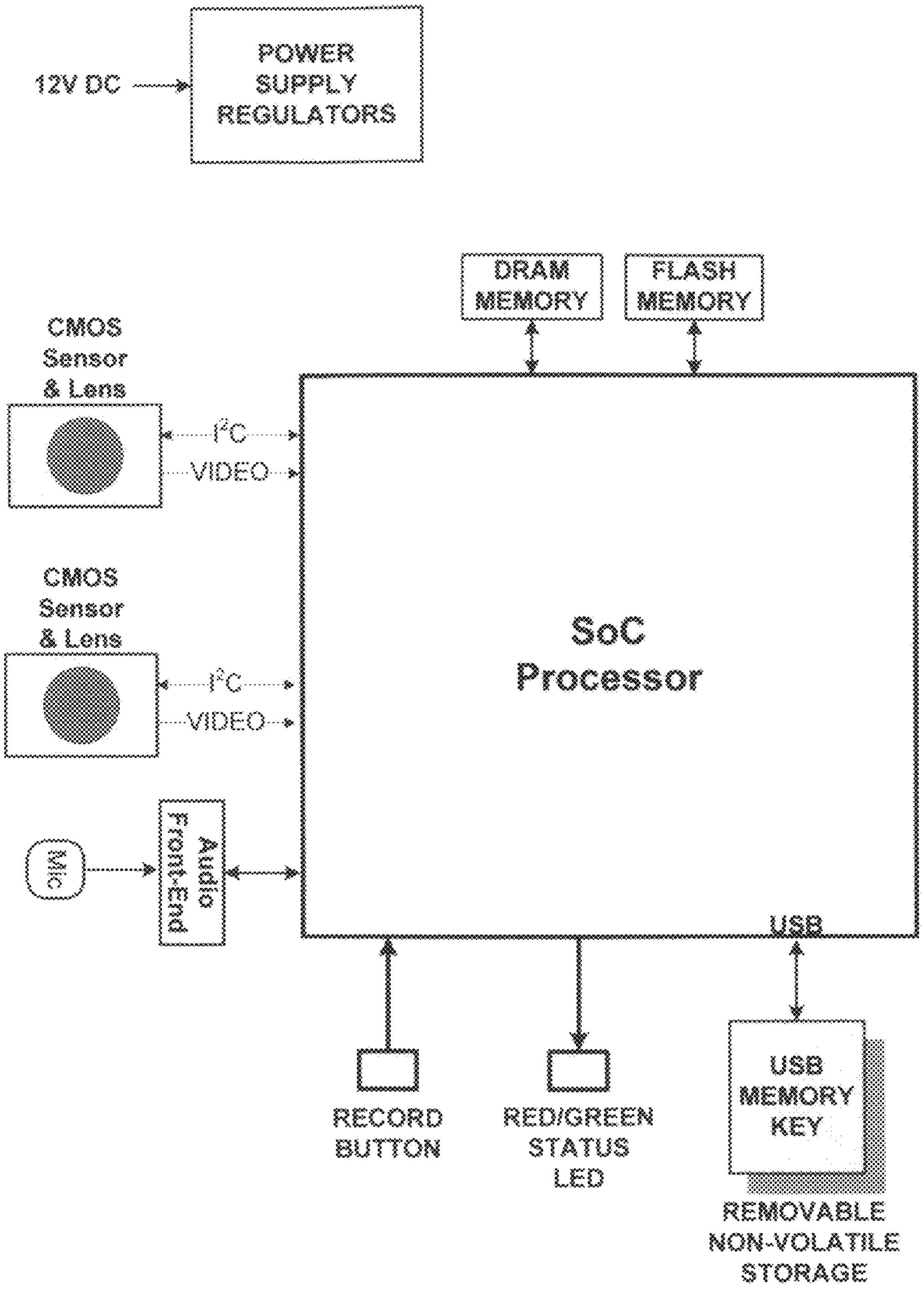
FIG. 3 shows block diagram of present invention.

FIG. 3 shows the block diagram of present invention. The System-on-Chip (SoC) includes multiple processing units for all audio and video processing, audio and video compression, and file and buffer management. A removable USB memory key interface is provided for storage of plurality of compressed audio-video channels. Two CMOS image sensors are interfaced to the SoC for simultaneous capture of two video channels at 30 frames-per-second at 720P HD (High Definition) or standard definition (640×480) resolution. Audio microphone and front-end is also in the same compact module, and SoC performs audio compression and multiplexes the audio and video data together.

Figure 4:
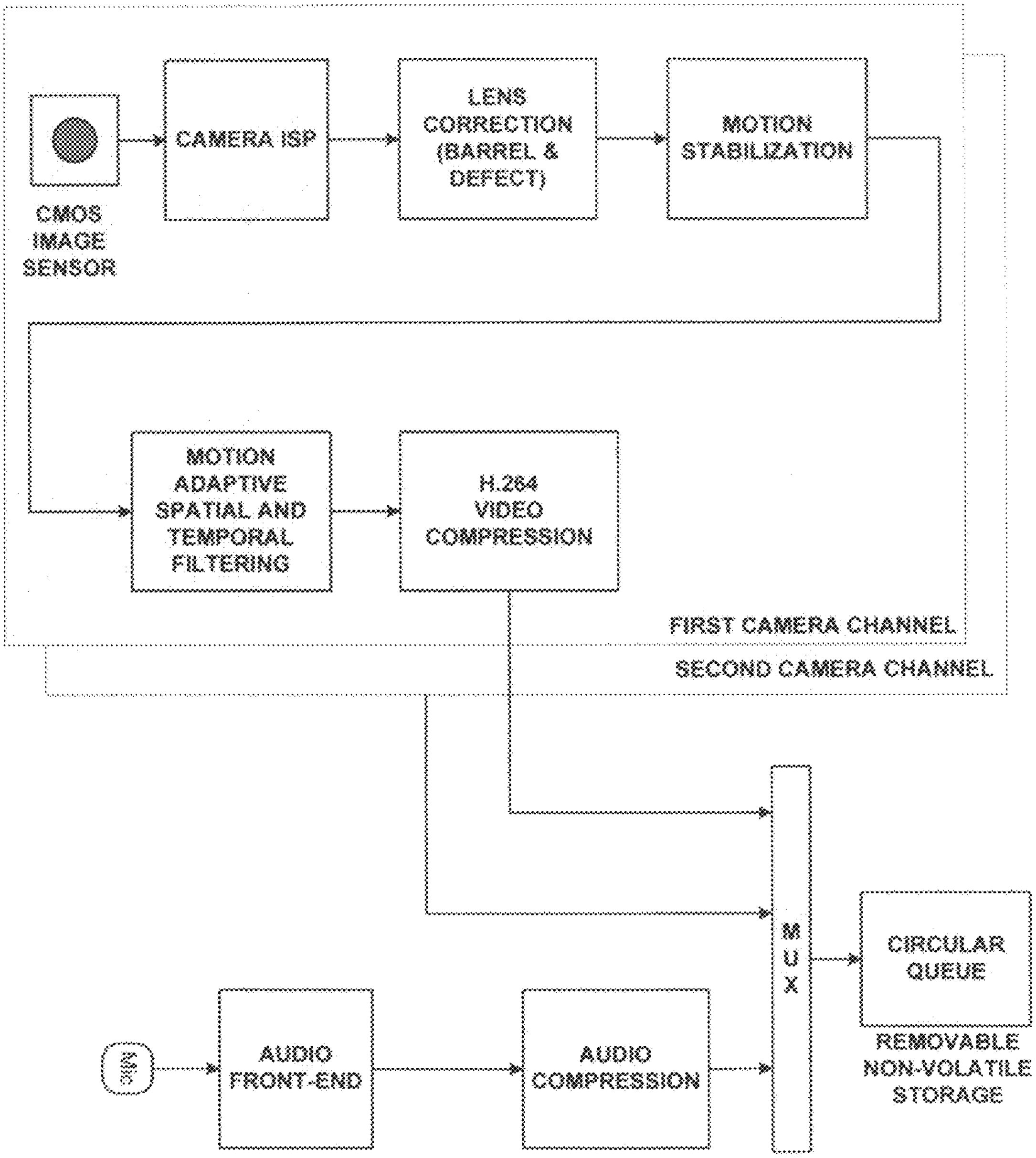
FIG. 4 shows block diagram of data processing and flow of present invention.

FIG. 4 shows the data flow of present invention. There is a separate channel for each camera image sensor. The output of each image sensor is interfaced to a camera Image Signal Processing (ISP) function as part of the camera module or the SoC. ISP performs auto white balance, auto-gain, Bayer conversion, lens defect correction, etc. Since images from a CMOS sensor does not have issues of interlaced video input, the resultant video is much higher quality, and resolution up to and including 720P could easily be obtained.

Special lens correction processing is performed to reduce barrel distortion due to wide angle lenses being used for wide area coverage. Barrel distortion is associated with wide angle (or minimal zoom) lenses and it causes the images to appear spherical (curved outward). Using wide-angle lenses causes a barrel effect. Such lens defects are removed in real-time by front-end processing.

Motion stabilization reduces jerky video due to shaking camera module by processing in digital domain. Each region of image is compared to the previous video frame to calculate how a given block of video has moved. Global movement of blocks in a linear direction are removed to reduce camera shaking effects. Motion adaptive spatial filtering compares each pixel of a given frame with same pixel from the last frame of video, and filtered new video frame and unfiltered video frame are combined with weights of x and (1−x), respectively, in accordance with difference said current and last frame pixel values. This has the effect of filtering high motion areas, since human visual system are less sensitive to noticing the resolution of such areas. Motion adaptive temporal reduces the video noise when there is no motion without reducing the video resolution. Two or more video frames are averaged on a pixel-by-pixel basis, in other words depending on the region of a video frame, in accordance with a IIR filter to reduce temporal noise. The resultant effect of motion adaptive spatial and temporal filtering prior to video compression is to significantly further increase the video compression and/or increase video quality.

Figure 5:
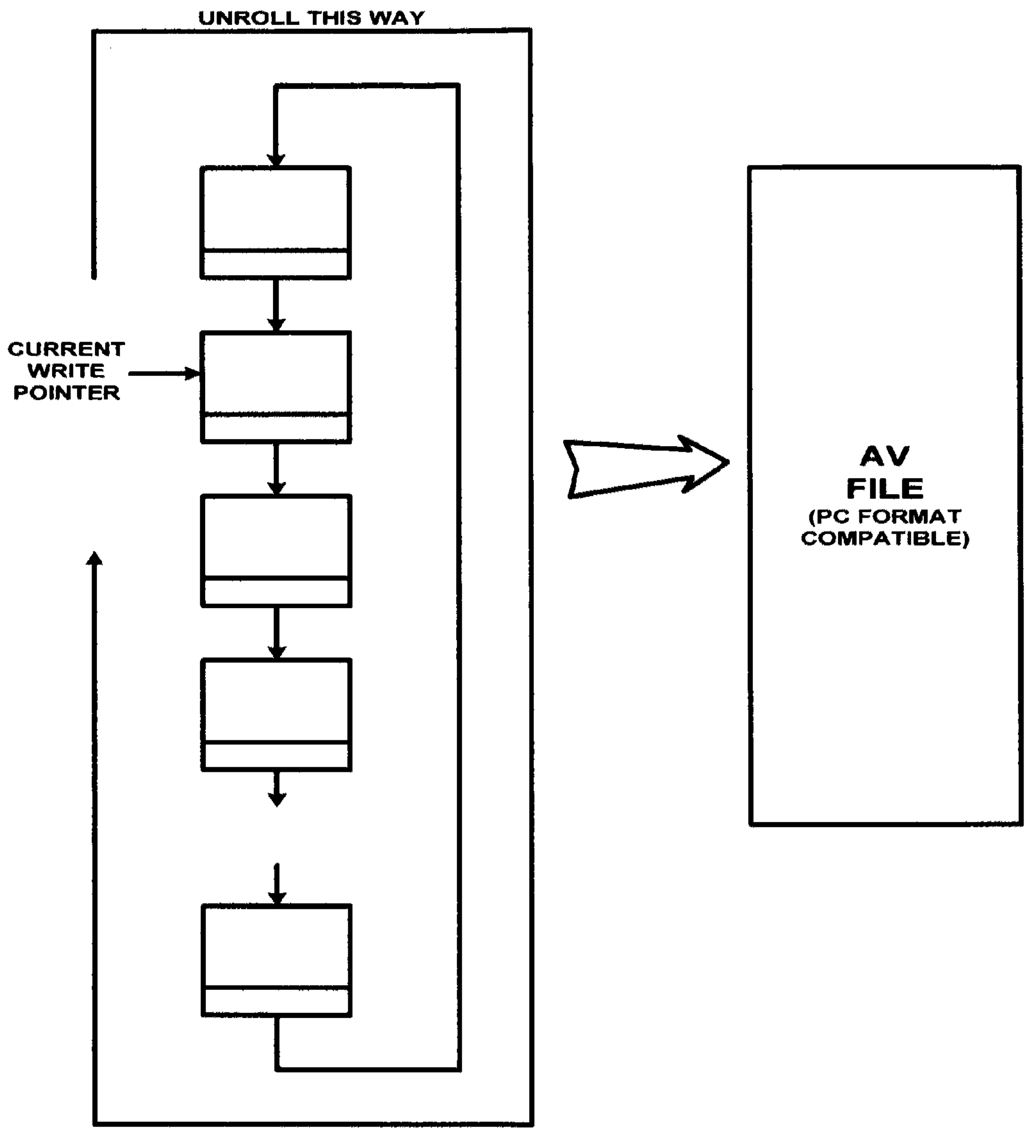
FIG. 5 shows block diagram of the circular queue storage for continuous record loop of present invention.

H.264 is used as the video compression as part of SoC, where H.264 is an advanced video compression standard that provides high-video quality and at the same time reduction of compressed video by a factor of 3-4× over previous MPEG-2 and other standards, but it requires more processing power and resources to implement. The compressed audio and multiple channels of video are multiplexed together by a multiplexer as part of SoC, and stored in a circular queue. The circular queue is located on a removable non-volatile semiconductor storage such a micro SD card, or USB memory key. This allows storage of data on a USB memory key at high quality without requiring the use of hard disk storage. Hard disk storage used by existing systems increases cost and physical size. SoC also performs audio compression, and multiplexes the compressed audio and video together. The multiplex compressed audio-video is stored on part of USB memory key in a continuous loop as shown in FIG. 5. At a typical 500 Kbits/sec at the output of multiplexer for standard definition video at 30 frames-per-second, we have 5.5 Gigabytes of storage required per day of storage. Using a 16 Gigabyte USB memory key could store about three days of storage, and 64 Gigabyte USB memory key can store about 11 days of storage.

Figure 6:
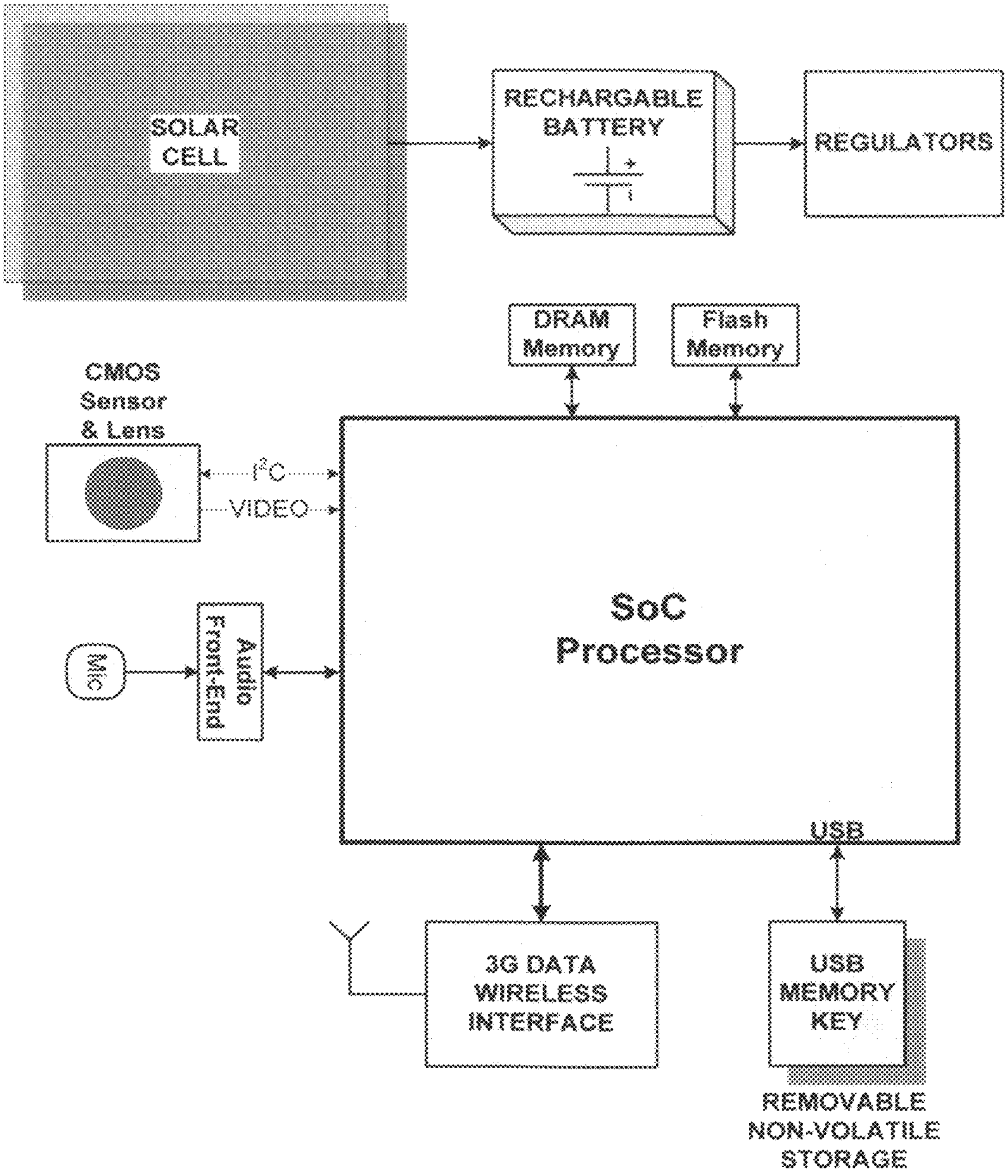
FIG. 6 shows the data processing and flow for single-camera embodiment.

Since the compressed audio-video data is stored in a circular queue with a linked list pointed by a write pointer as shown in FIG. 6, the circular queue has to be unrolled and converted into a file format recognizable as one of commonly used PC audio-video file formats. This could be done, when recording is stopped by pressing the record key by doing post processing by the SoC prior to removal of USB key. Such a conversion could be done quickly and during this time status indicator LED could flash indicating wait is necessary before USB memory key removal. Alternatively, this step could be performed on a PC, but this would require installing a program for this function on the PC first.

An embodiment of present invention, shown in FIG. 6, uses a solar cell embedded on a surface of the compact audio-video recorder, a built-in rechargeable battery, and a 3G or 4G data wireless transfer interface. This embodiment requires no cabling.

Figure 7:
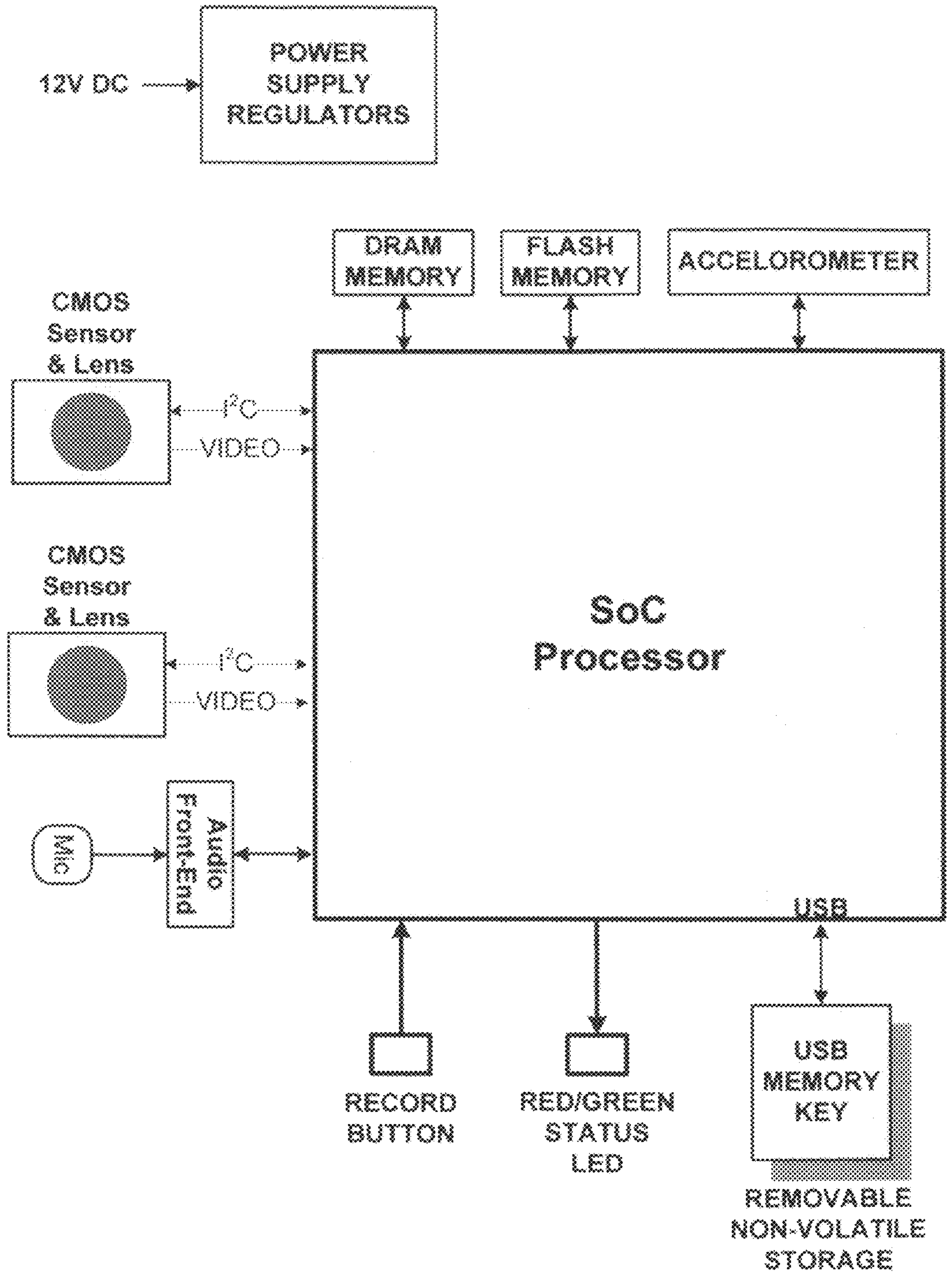
FIG. 7 shows block diagram of solar cell rechargeable embodiment of present invention using 3G data wireless network interface.

Another embodiment of present invention shown in FIG. 7 includes an accelerometer, using which SoC calculates the current speed and acceleration data and continuously stores it together with audio-video data for viewing at a later time.

Figure 8:
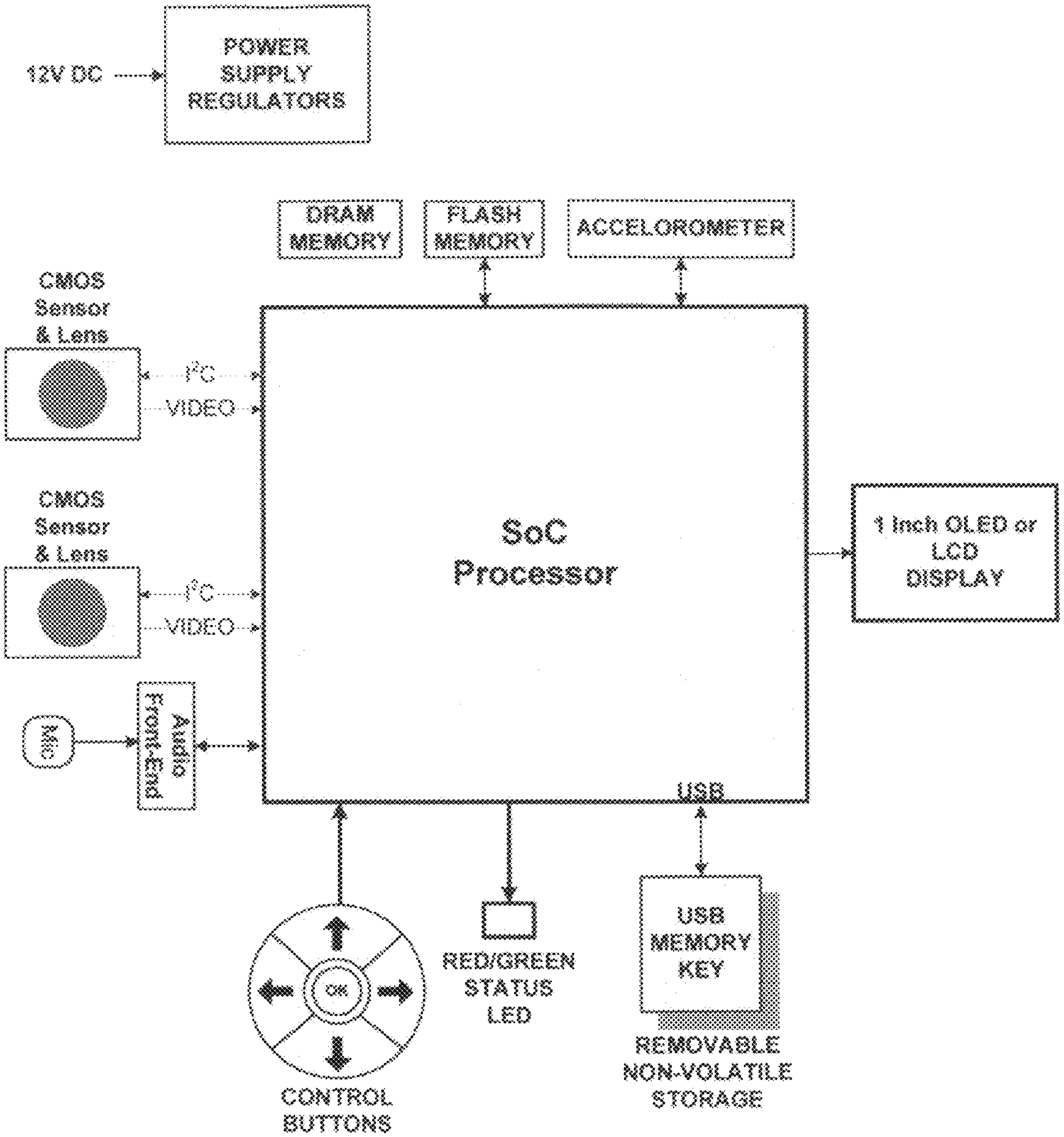
FIG. 8 shows embodiment of present invention with dual camera and accelerometer.

Another embodiment, shown in FIG. 8, also includes a small 1-inch LCD or OLED display for on-the-spot viewing of recorded data. This embodiment uses a four-way cursor buttons and center "OK" button to select in conjunction with graphical user interface displayed on the LCD/OLED screen for control of record and playback functions.

Figure 9:
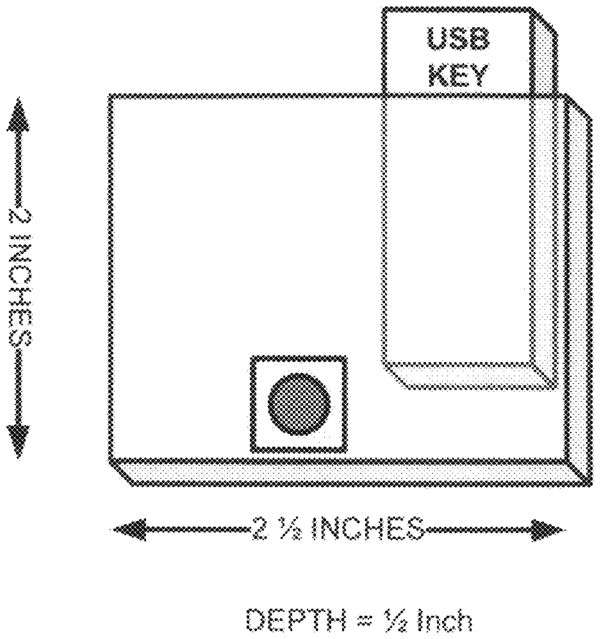
FIG. 9 shows embodiment of present invention with dual camera, 1 inch OLED display, and accelerometer.
Figure 10:
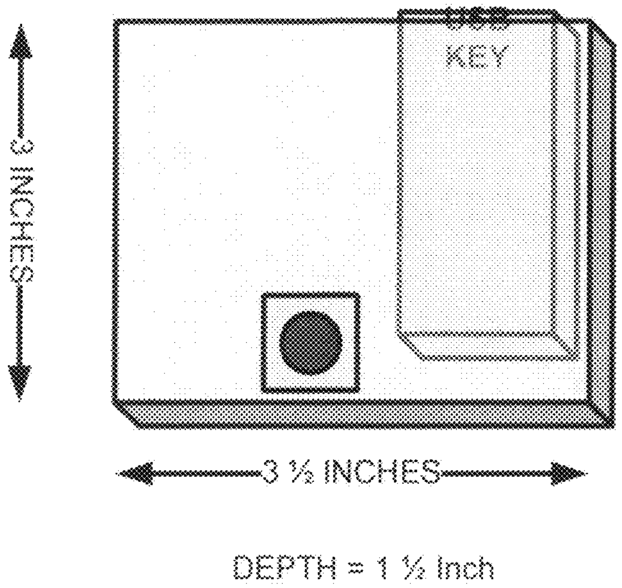
FIG. 10 shows example physical size of preferred embodiment with one camera.
Figure 11:
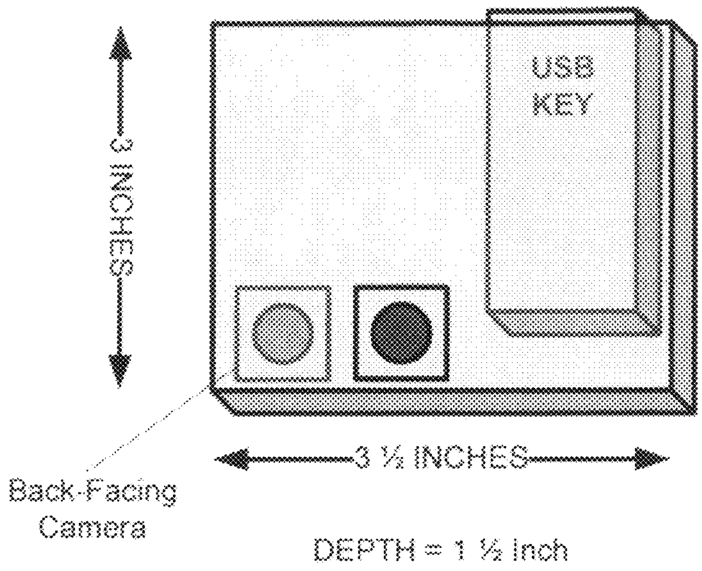
FIG. 11 shows example physical size of preferred embodiment with two cameras.
Figure 12:
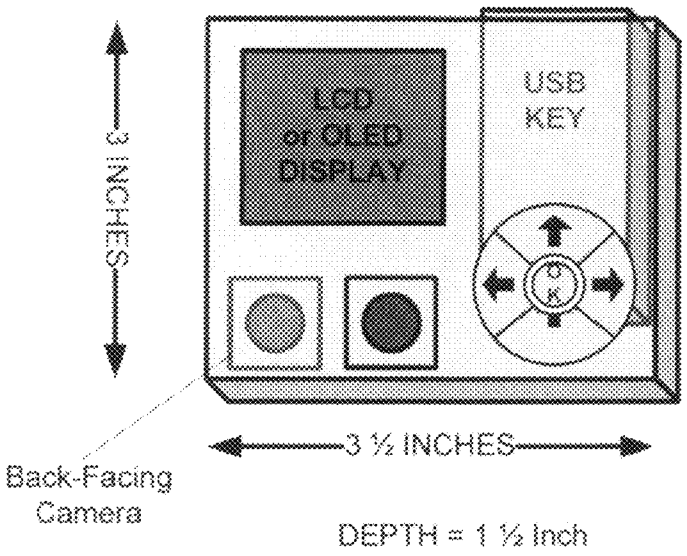
FIG. 12 shows example physical size of preferred embodiment with two cameras, LCD or OLED display screen, and graphical user interface control buttons.
Figure 13:
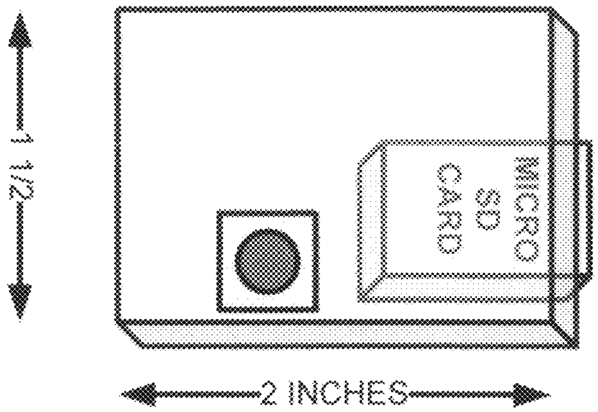
FIG. 13 shows three camera embodiment for close to 360 degrees coverage in the same compact enclosure.
Figure 14:
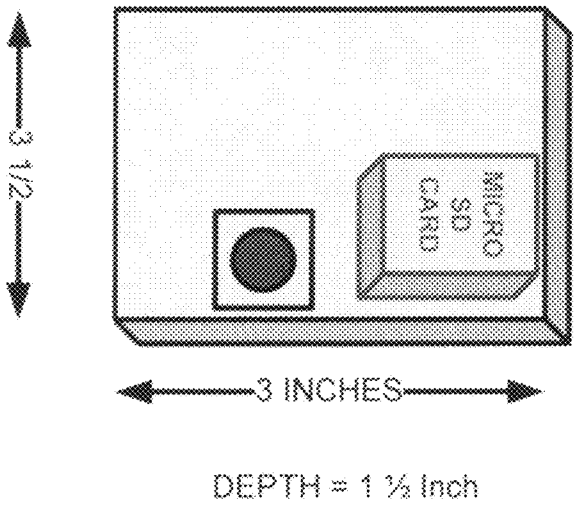
FIG. 14 shows a single camera embodiment with micro SD card for storage in a smaller compact enclosure.
Figure 15:
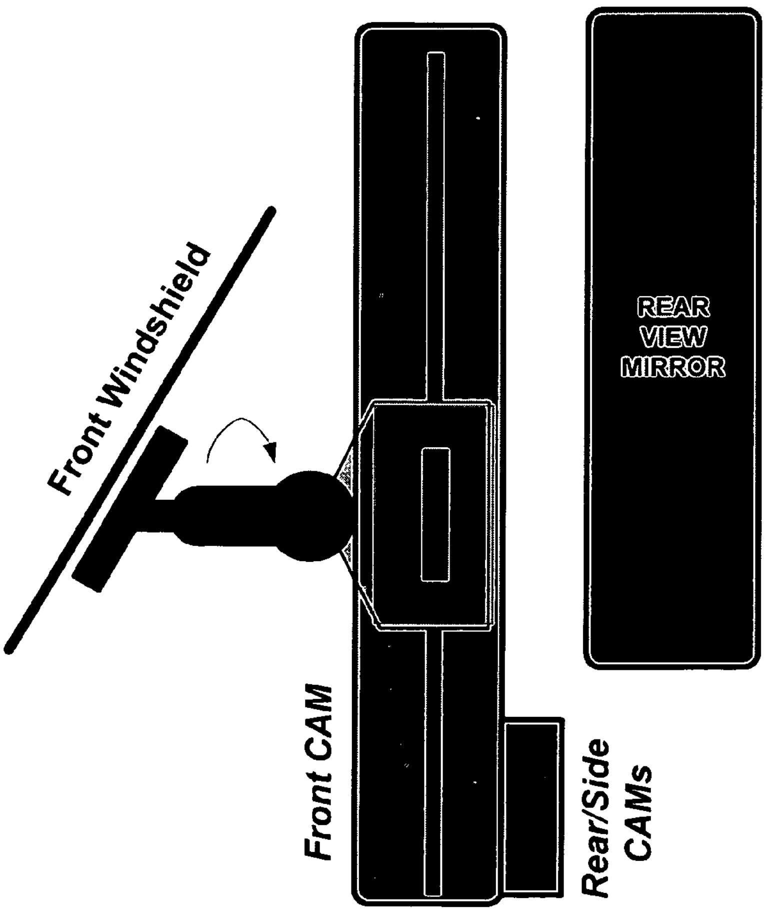
FIG. 15 shows the placement of the video security unit behind the mirror on the windshield.

FIG. 9 shows the physical size of present invention in one-camera embodiment. FIG. 10 shows the physical size of two-camera embodiment. FIG. 11 shows the two-camera embodiment with LCD/OLED display, and cursor control buttons. FIG. 12 shows the view angle (shown from top) for a three camera embodiment of car security system. Figure shows the physical size of embodiment using micro SD memory card for storage of continuous record loop. The micro SD card is removable.

I claim:

1. An apparatus for a vehicle security system, the apparatus comprising:

a front view camera sensor, said front view camera sensor is configured to capture 30 frames-per-second at a minimum of high definition resolution;

a rear and side view wide angle camera sensor, said rear and side view wide angle camera sensor is configured to capture 30 frames-per-second at a minimum of high definition resolution;

at least one image signal processor coupled to said front view camera sensor and said rear and side view wide angle camera sensor for performing image signal processing functions including but not limited to auto white balance, auto gain, wide-angle lens barrel distortion reduction, lens defect compensation, and motion stabilization;

a motion adaptive spatial and temporal filtering unit that is coupled to output of said at least one image signal processor for preprocessing of video data;

at least one video compression unit according to H.264 standard that is coupled to output of said motion adaptive spatial and temporal filtering unit, said at least one video compression unit can compress 30 frames-per-second at a minimum of high definition resolution;

a microphone, audio preamplifier, audio-to-digital conversion circuit, and an audio compression unit;

a multiplexer to combine output of said audio compression unit and said at least one video compression unit;

a processor to store output of said multiplexer on a removable non-volatile semiconductor storage media in a continuous record loop in a circular buffer, said circular buffer stores multiple days of storage of surveillance data, in accordance with size of said removable non-volatile semiconductor storage media, before oldest data is overwritten by newly recorded video;

an Internet interface unit coupled to said processor, said Internet interface uses an interface including but not limited to 802.11 wireless interface, 3G data interface, or 4G data interface;

a transrating unit coupled to said removable non-volatile semiconductor storage media using said Internet interface unit for transmitting said stored surveillance data at a different bit rate in accordance with transmit channel and destination capabilities;

the apparatus is housed in a single and compact housing that is mounted on the front or back windshield of a vehicle; and said removable non-volatile semiconductor media is configured to be unplugged and contents of said semiconductor media are viewed when plugged into a personal computer or a TV.

2. The apparatus according to claim 1, wherein said removable non-volatile semiconductor media is one of including but not limited to USB memory key, SDHC memory card, micro SD card.

3. The apparatus according to claim 1, further including an accelerometer to store speed and acceleration information as meta data along with audio and video data.

4. The apparatus according to claim 1, further including a rechargeable battery.

5. An apparatus for personal security and evidentiary recording, the apparatus comprising:

a front field of view camera image sensor with at least high definition resolution;

a rear and side wide angle field of view camera image sensor with at least high definition resolution;

an audio microphone;

a removable flash memory including but not limited to USB memory key, SD memory card, or micro SD memory card;

a rechargeable battery;

a system-on-a-chip processor coupled to said removable flash memory, said rear and side field of wide angle view camera image sensor and said front field of view camera image sensor, said system-on-a-chip processor comprising:

a camera ISP hardware unit for both said rear and side field of wide angle view camera image sensor and said front field of view camera image sensor;

a lens correction ISP hardware unit for both said rear and side field of wide angle view camera image sensor and said front field of view camera image sensor, which performs including but not limited to lens barrel distortion and lens defect compensation;

a motion stabilization ISP hardware unit that is coupled to output of said lens correction ISP hardware unit for both said rear and side field of wide angle view camera image sensor and said front field of view camera image sensor;

a motion adaptive spatial and temporal filtering ISP hardware unit that is coupled to output of said motion stabilization hardware unit for both said rear and side field of wide angle view camera image sensor and said front field of view camera image sensor;

at least one H.264 video compression unit at 30 frames-per-second for multiple video streams that is coupled to output of said motion adaptive spatial and temporal filtering ISP hardware unit;

a transrating unit coupled to said removable flash memory for changing bit rate and resolution before transmittal in accordance with transmit channel conditions and request from a remote viewing site;

an audio front-end and an audio compression unit;

an audio and video multiplexing unit for combining the output of said audio compression unit and said at least one H.264 video compression unit;

wherein compressed and multiplexed audio-video is stored on said removable flash memory using a circular queue, said circular queue stores at least several days of recording;

a 3G data connection interface to transfer a portion of said multiplexed audio-video stored on said removable flash memory from time t1 to time t2 in accordance with a remote request;

wherein contents of said removable flash memory is are viewable on a personal computer or a TV; and a small compact enclosure that is smaller than 2½ inch by 2 inch by ½ inch in size that includes and integrates all parts of said apparatus is mounted on a vehicle windshield.

6. The apparatus according to claim 5, further including an accelerometer for recording speed and acceleration data in addition to audio and video data.

7. The apparatus according to claim 5, further including a solar cell to recharge said rechargeable battery.

* * * * *